July 1, 1952  M. F. SMITH ET AL  2,601,840
INDICATING PROTECTIVE COVER FOR PIPE FLANGES AND VALVES
Filed Nov. 29, 1950
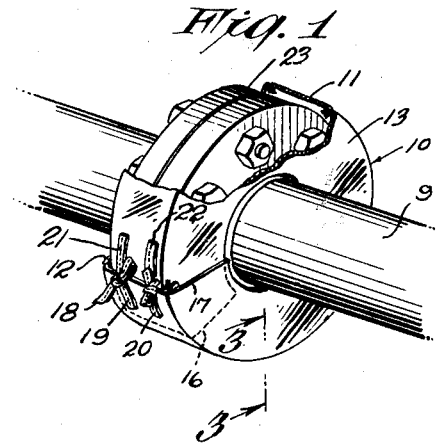
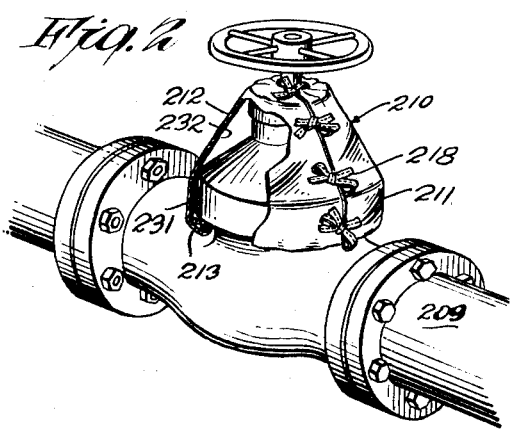
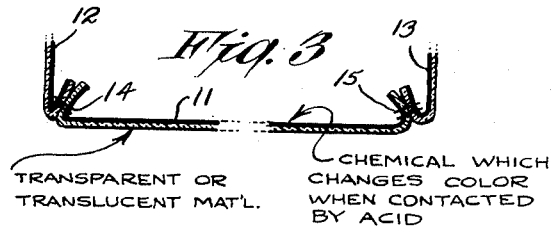
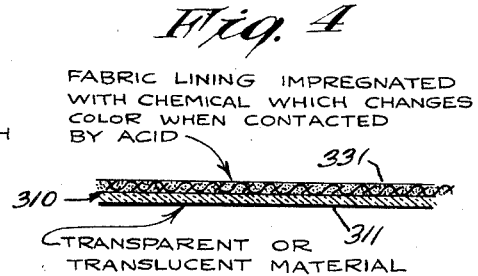
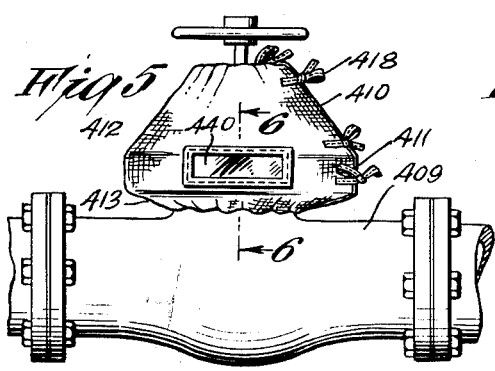
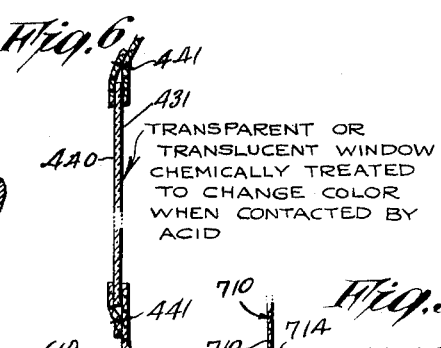
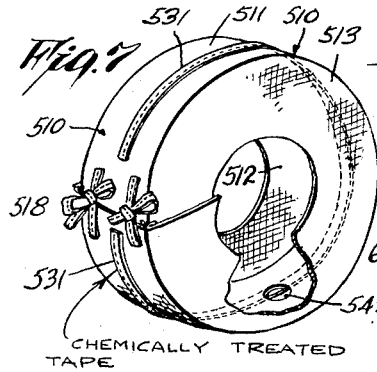
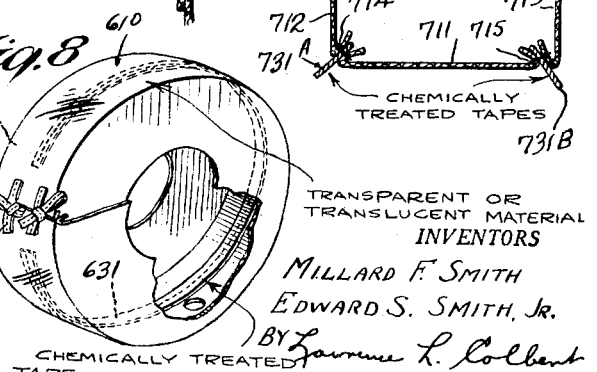
INVENTORS
MILLARD F. SMITH
EDWARD S. SMITH, JR.
BY Lawrence L. Colbert
ATTORNEY Patented July 1, 1952

2,601,840

UNITED STATES PATENT OFFICE 2,601,840

INDICATING PROTECTIVE COVER FOR PIPE FLANGES AND VALVES

Millard F. Smith and Edward S. Smith, Jr., New York, N. Y.

Application November 29, 1950, Serial No. 198,122

2 Claims. (Cl. 116—114)

This invention relates generally to the transmission of fluids through pipes and similar conduits and more particularly to indicating protective covers for pipe and conduit connections and valves.

Where pipes and pipelines are used to carry gases and liquids under pressure, the connections between pipe ends are commonly made by the joining together of radial flanges by a plurality of bolts and a compressible packing therebetween.

Because of the relatively high pressure involved and the corrosive nature of the chemical products in gas or liquid form carried by the pipes, leakage of the packing frequently occurs. Such leakage is capable of creating injury to persons and damage to property. It is known to apply grease and similar protective coatings to the exterior surfaces of the joint, but where the pipeline is exposed to the weather a coating becomes washed off by rain. Frequently the portions of the metallic pipeline which have been engaged by wrenches or the like have the exterior surface thereof abraded so that they tend to rust. Where a cover is applied to the joint or valve to protect it from the weather, frequently the seepage is confined and considerable corrosion results before the leak is detected.

It is therefore among the objects of the present invention to provide novel and useful indicating protective cover constructions for pipe flange connections and valves.

The present covers also act as a shield in the event of accidental leakage at the packing at the joints so that spray is prevented from reaching persons or property.

Another object herein lies in provision of structure of the character described having indicated means which is quickly and easily put in place or removed.

The present devices permit rapid inspection of the joints without opening the covers so that maintenance of the line is thereby reduced.

These objects and other incidental ends and advantages will more fully appear in the progress of this disclosure and be pointed out in the appended claims.

In the drawings similar reference characters designate corresponding parts throughout the several views of each embodiment:

Figure 1 is a view in perspective of an indicating cover in place and upon a pipe flange joint, and shows a first embodiment of the invention. In this figure parts are broken away.

Figure 2 is a fragmentary view in perspective showing a second embodiment of the invention as applied to a pipe valve.

Figure 3 is an enlarged fragmentary vertical sectional view as seen from the plane 3—3 on Figure 1.

Figure 4 is an enlarged fragmentary sectional view of a third embodiment of the invention.

Figure 5 is an elevational view of a fourth embodiment of the invention.

Figure 6 is an enlarged fragmentary sectional view of Figure 5 as seen from the plane 6—6 thereon.

Figure 7 is a view in perspective with parts broken away to show internal construction, showing a fifth embodiment of the invention.

Figure 8 is a view comparable to Figure 7 showing a sixth embodiment.

Figure 9 is a fragmentary vertical sectional view corresponding generally to Figure 3 and showing a seventh embodiment.

Turning now to Figures 1 and 3, the indicating cover is generally shown by reference character 10 and comprises broadly: a generally circumferential outer wall 11 and end walls 12 and 13. The outer wall 11 may be joined to the end walls 12 and 13 by the seams 14 and 15. The ends 16 and 17 preferably overlap and may be detachably interconnected by means 18 for that purpose, such as the ties 19 to 22.

The outer wall 11 as well as the end walls 12 and 13 are preferably composed of a transparent or translucent material having the desired physical strength and chemical resistance against the material transported through the pipe 9. Such translucent or transparent materials may be sheet nylon, or other artificial resins such as for example vinyl copolymers. Depending upon the material transported in the pipe chlorinated rubber or unpigmented natural rubber may be used. Disposed on the inner surface of the walls 11 to 13 inclusive are the indicating elements 31, 32 and 33, which elements are preferably in the form of a flexible layer disposed upon and physically secured to the inner surfaces of the walls 11—13. The indicating elements are composed of suitable indicators depending upon the nature of the material carried by the pipe 9 and may include such substances as thymol blue, methyl red, phenolphthalein or litmus. Suitable binders or carriers may be incorporated with these chemical substances to physically position them so that they may be viewed by an inspector who may look through the walls 11—13. Suitable water soluble adhesives should be used in securing the indicating mass to the inner surfaces of said walls and these should be neutral or opposite to the acidity or alkalinity of the material carried in the pipe 9.

Thus for example phenolphthalein may be disposed in or upon an absorbent carrier such as paper or paper shreds and by a neutral or slightly alkaline binder held in place. The paper can be white. Whenever acid might leak out upon the packing 23 such seepage striking the indicating elements could be noticed from outside the device and the condition corrected. Where the pipe carried for example ammonia, the indicating element could be impregnated with litmus which being red would change to blue upon leakage occurring.

Turning now to the second embodiment of the invention here it is illustrated as embodied in a valve cover and apart from its shape which is different in order to cover the valve, the same general construction is utilized. For the purpose of avoiding unnecessary repetition certain of the parts corresponding to the first embodiment are given the same reference characters with the prefix 2.

Turning now to the embodiment shown in Figure 4, here construction is shown in which the outer wall 311 is composed of a transparent or translucent layer which lies outwardly of the indicating element 331. This construction for example might be in the form of a fabric of which the wall 311 is a part which is impregnated with a suitable indicating material such as those described above, and in which the transparent or translucent material may be a coating of flexible lacquer, synthetic resin, natural resins, or oxidized oil. Here for example the interior portion of the cover could be composed of cotton or similar absorbent material and the outer layer 311 might be lacquer, shellac, or cellulose acetate or cellulose nitrate with suitable softening agents incorporated therein. Depending upon whether fire safety is required the materials employed may be relatively fire proof or slow burning.

Turning to the fourth embodiment shown in Figures 5 and 6 here the cover itself resembles the cover of Figure 2 except that the indicating portion of the device is confined to a transparent or translucent window 440 and the indicating element 431 is disposed on the inner surface thereof. The window may be secured in place in a suitable manner as for example by cement or the stitches 441 may be moved inwardly of the window 440 to engage the same. Cementing is desirable where the window is relatively rigid and the window may be composed for example of glass, or a relatively stiff sheet synthetic resin or the like. The indicating element 431 again is composed of suitable indicating chemicals incorporated with suitable carriers and binders to maintain said chemicals in position upon the inner surface of the window 440. To avoid unnecessary repetition certain parts corresponding to the described embodiments are given the same reference characters with the addition of the prefix 4.

In the fifth embodiment shown in Figure 7, the cover 510 may be composed of opaque material and the outer wall 511 has a strip of tape to form the indicating element 531. The tape communicates with a bottom drain opening 542 so that seepage reaches the tape which acts like a wick to carry the flow and to indicate its presence.

Figure 8 shows the sixth embodiment and here the body of the cover 610, particularly the outer wall 611, is composed of transparent or translucent material and the indicating element 631 is located on the inner surface of the outer wall 611 where the indicating effect may be viewed by the inspector.

In Figure 9 in the seventh embodiment the outer wall 711 as well as the end walls 712 and 713 may be composed of opaque material and the indicating elements 731A and 731B may be interposed in the seams formed by the stitches 714 and 715. Since said indicating elements extend from inside the cover to the outside thereof seepage is carried outwardly by the wicklike action of the tapes. Thus they may be impregnated with the indicating materials to conveniently and visually indicate to the inspector that leakage has taken place.

It may thus be seen that we have disclosed novel and useful indicating protective covers for joints of conduits, valves and pipes carrying corrosive or other materials of a similar nature. The present constructions may be made in large scale at low cost so that they may be applied to protect long lines. The color appearance may be readily viewed from a distance so that the inspector may travel along the lines at a relatively rapid rate stopping only to make repairs where color indication shows that seepage has occurred.

In accordance with the invention, and where the conditions of use permit, the material composing the indicating element may be directly impregnated in the outer wall 11 and/or the end walls 12 and 13 may be secured to the outer or inner surfaces thereof. Where the indicating material is in the walls or on the outer surface thereof, said walls are composed of porous material.

We wish it to be understood that we do not desire to be limited to the exact details of construction shown and described for obvious modifications will occur to persons skilled in the art to which the present invention pertains. In the following claims the word translucent is intended to mean translucent or transparent.

We claim:

1. Protective indicating cover structure comprising: a body having an opening; an indicating element composed of porous material in tape form disposed on the outer surface of said body, and communicating with said opening; whereby said indicating element may pick up seepage emanating from the opening, and conduct it from said opening along the outer surface of said body by capillary action.

2. Protective indicating cover structure comprising: a body formed of planar wall members, and seamed interconnecting means therefor; an indicating element in porous tape form interposed in the seams, and extending to the inner and outer surfaces of said wall members; whereby moisture accumulating within said cover structure may by capillary action be transmitted to the outer surface of said cover structure.

MILLARD F. SMITH.
EDW. S. SMITH, Jr.

REFERENCES CITED

The following references are of record in the file of this patent:

UNITED STATES PATENTS

| Number | Name | Date |
|---|---|---|
| 1,516,454 | Norton | Nov. 18, 1924 |
| 2,428,861 | Waring et al. | Oct. 14, 1947 |
| 2,446,361 | Clibbon | Aug. 3, 1948 |

FOREIGN PATENTS

| Number | Country | Date |
|---|---|---|
| 284,120 | Great Britain | Jan. 26, 1928 |